United States Patent
Nagasawa

(10) Patent No.: US 10,272,865 B2
(45) Date of Patent: Apr. 30, 2019

(54) ARM REST

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/873,196

(22) Filed: Jan. 17, 2018

(65) Prior Publication Data

US 2018/0281723 A1 Oct. 4, 2018

(30) Foreign Application Priority Data

Mar. 31, 2017 (JP) ................................. 2017-070877

(51) Int. Cl.
| | |
|---|---|
| *B60R 21/02* | (2006.01) |
| *B60R 21/16* | (2006.01) |
| *B60R 21/207* | (2006.01) |
| *B60R 21/18* | (2006.01) |
| *B60N 2/75* | (2018.01) |
| *B60R 21/00* | (2006.01) |

(52) U.S. Cl.
CPC ................ *B60R 21/18* (2013.01); *B60N 2/79* (2018.02); *B60R 21/207* (2013.01); *B60N 2/767* (2018.02); *B60R 2021/0044* (2013.01); *B60R 2021/022* (2013.01); *B60R 2021/0293* (2013.01)

(58) Field of Classification Search
CPC . B60R 21/18; B60R 21/207; B60R 2021/022; B60R 2021/0293; B60R 2021/0044; B60N 2/79; B60N 2/767

USPC ................................................. 297/487, 488
See application file for complete search history.

(56) References Cited

U.S. PATENT DOCUMENTS

| | | | | |
|---|---|---|---|---|
| 2,861,626 A | * | 11/1958 | Mills, Jr. ................ | B60R 21/02 |
| | | | | 297/488 X |
| 3,409,326 A | * | 11/1968 | Kerner ................ | B60N 2/4221 |
| | | | | 297/488 X |

(Continued)

FOREIGN PATENT DOCUMENTS

| | | | | |
|---|---|---|---|---|
| JP | S59-100633 U1 | | 7/1984 | |
| JP | 59156836 A | * | 9/1984 | ........... B60N 2/2839 |

(Continued)

OTHER PUBLICATIONS

Office Action received in Japanese Patent Application No. 2017-070877 dated Nov. 20, 2018 (3 pages in Japanese with English translation).

*Primary Examiner* — Rodney B White
(74) *Attorney, Agent, or Firm* — Smith, Gambrell & Russell, LLP

(57) ABSTRACT

An arm rest attachable to a seat for a vehicle occupant to sit on includes side members, a front member, and a rear member. The side members include a pair of side members provided at left and right sides of the vehicle occupant and extending in a front-rear direction. The front member is in front of the vehicle occupant when the vehicle occupant is seated and is configured to couple front sides of the left and right side members to each other at least when in use. The rear member couples the seat to rear sides of the side members. The side members and the front member are rotatable about a line that connects left and right coupled points between the rear member and the seat.

15 Claims, 3 Drawing Sheets

(56) References Cited

U.S. PATENT DOCUMENTS

| | | | | |
|---|---|---|---|---|
| 3,453,026 A * | 7/1969 | Paes | B60R 21/02 297/487 X |
| 3,591,232 A * | 7/1971 | Simon | B60R 21/02 297/487 X |
| 3,640,572 A * | 2/1972 | Doehler | B60R 21/02 297/488 X |
| 3,722,951 A * | 3/1973 | Ezquerra | B60R 21/02 297/487 X |
| 3,764,180 A * | 10/1973 | Mulholland | A61G 5/12 297/488 X |
| 3,829,158 A * | 8/1974 | O'Connor | B60R 21/02 297/488 X |
| 3,836,168 A * | 9/1974 | Nonaka | B60R 21/08 297/487 X |
| 3,837,670 A * | 9/1974 | Hilyard | B60R 21/02 297/488 X |
| 3,899,042 A * | 8/1975 | Bonar | B60R 21/02 297/487 X |
| 3,901,550 A * | 8/1975 | Hamy | B60R 21/02 297/488 X |
| 3,924,874 A * | 12/1975 | Barenyi | B60R 21/02 297/488 X |
| 4,230,366 A * | 10/1980 | Ruda | B60N 2/3081 297/487 X |
| 4,509,798 A * | 4/1985 | Strothers | B60R 21/02 297/487 X |
| 4,579,191 A * | 4/1986 | Klee | B60J 5/0487 297/488 X |
| 4,749,229 A * | 6/1988 | Dorto | B60N 2/286 297/488 X |
| 4,813,746 A * | 3/1989 | Mulholland | A61G 5/12 297/488 X |
| 4,913,498 A * | 4/1990 | Forlivio | B60N 2/3084 297/488 X |
| 4,986,600 A * | 1/1991 | Leblanc | B60N 2/3084 297/488 X |
| 5,026,118 A * | 6/1991 | Vander Stel | B60N 2/3084 297/488 X |
| 5,100,199 A * | 3/1992 | Vander Stel | A61K 31/155 297/488 X |
| 5,129,478 A * | 7/1992 | Suenaga | B60R 21/02 297/487 X |
| 5,286,091 A * | 2/1994 | Busch | B60R 21/02 297/487 X |
| 5,476,309 A * | 12/1995 | Chen | B60R 21/02 297/487 X |
| 5,492,361 A | 2/1996 | Kim | |
| 5,499,844 A * | 3/1996 | Dirck | B60R 21/02 297/487 X |
| 5,758,582 A * | 6/1998 | Gnezdilov | B60N 2/24 297/488 X |
| 5,938,237 A * | 8/1999 | Abels | B60J 5/0487 297/488 X |
| 6,056,359 A * | 5/2000 | Clark | B63B 29/04 297/488 X |
| 6,709,063 B1 * | 3/2004 | Furukawa | B60R 21/02 297/488 X |
| 7,204,559 B2 * | 4/2007 | Berra | B60R 21/02 297/487 X |
| 7,887,140 B1 * | 2/2011 | Forlivio | B60N 2/26 297/238 |
| 2002/0195868 A1 * | 12/2002 | Tsai | B60N 2/265 297/487 |
| 2003/0168902 A1 * | 9/2003 | Wiener | B60J 5/042 297/487 |
| 2006/0055228 A1 * | 3/2006 | Tsai | B60N 2/2812 297/488 |

FOREIGN PATENT DOCUMENTS

| | | | | |
|---|---|---|---|---|
| JP | 59156837 A | * | 9/1984 | ........... B60N 2/2839 |
| JP | S61-125844 U1 | | 8/1986 | |
| JP | 63215449 A | * | 9/1988 | |
| JP | H02-57737 U1 | | 4/1990 | |
| JP | 04039134 A | * | 2/1992 | ........... B60N 2/2812 |
| JP | 2005-125944 A | | 5/2005 | |
| JP | 2016-199123 A | | 12/2016 | |

* cited by examiner

1

ARM REST

CROSS-REFERENCE TO RELATED APPLICATIONS

The present application claims priority from Japanese Patent Application No. 2017-070877 filed on Mar. 31, 2017, the entire contents of which are hereby incorporated by reference.

BACKGROUND

1. Technical Field

The present invention relates to arm rests, and particularly, to an arm rest that can directly protect a vehicle occupant, as compared with the related art.

2. Related Art

Various airbags for protecting vehicle occupants, such as drivers, have been developed. For instance, a vehicle driver-seat airbag device disclosed in Japanese Unexamined Patent Application Publication No. 2016-199123 includes a main chamber that deploys in front of the driver and sub chambers that deploy at the lateral sides of the main chamber. With the main chamber and the sub chambers, the driver can be prevented from moving diagonally forward in the event of a collision.

However, in a case where the collision involves deformation of the vehicle cabin, there is a possibility that the deformed area of the vehicle cabin may directly hit against not only the driver but also a passenger. Under the existing conditions, this type of collision is dealt with by controlling the deformation of the vehicle body, deploying an airbag between the deformed area and the vehicle occupant, and so on. The use of an arm rest as a vehicle-occupant protection member is nonexistent or rare.

SUMMARY OF THE INVENTION

It is desirable to provide an arm rest that can directly protect a vehicle occupant, as compared with the related art.

An aspect of the present invention provides an arm rest that is attachable to a seat for a vehicle occupant to sit on and that includes side members, a front member, and a rear member. The side members include a pair of side members provided at left and right sides of the vehicle occupant and extending in a front-rear direction. The front member is in front of the vehicle occupant when the vehicle occupant is seated. and is configured to couple front sides of the left and right side members to each other at least when in use. The rear member couples the seat to rear sides of the side members. The side members and the front member are rotatable about a line that connects left and right coupled points between the rear member and the seat.

DETAILED DESCRIPTION

Basic Example

An arm rest according to an example of the present invention will he described below with reference to FIGS. 1A and 1B.

Figure 1A:
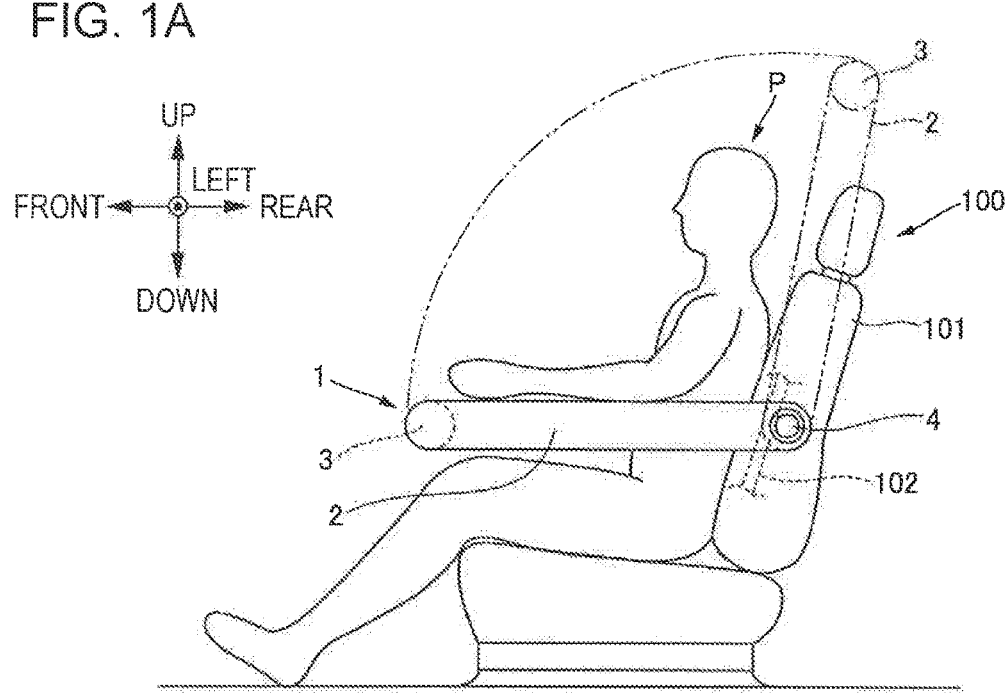
FIGS. 1A and 1B schematically illustrate a seat equipped with an arm rest according to an example of the present invention, FIG. 1A being a side view schematically illustrating the seat, FIG. 1B being a plan view schematically illustrating the seat.
Figure 1B:
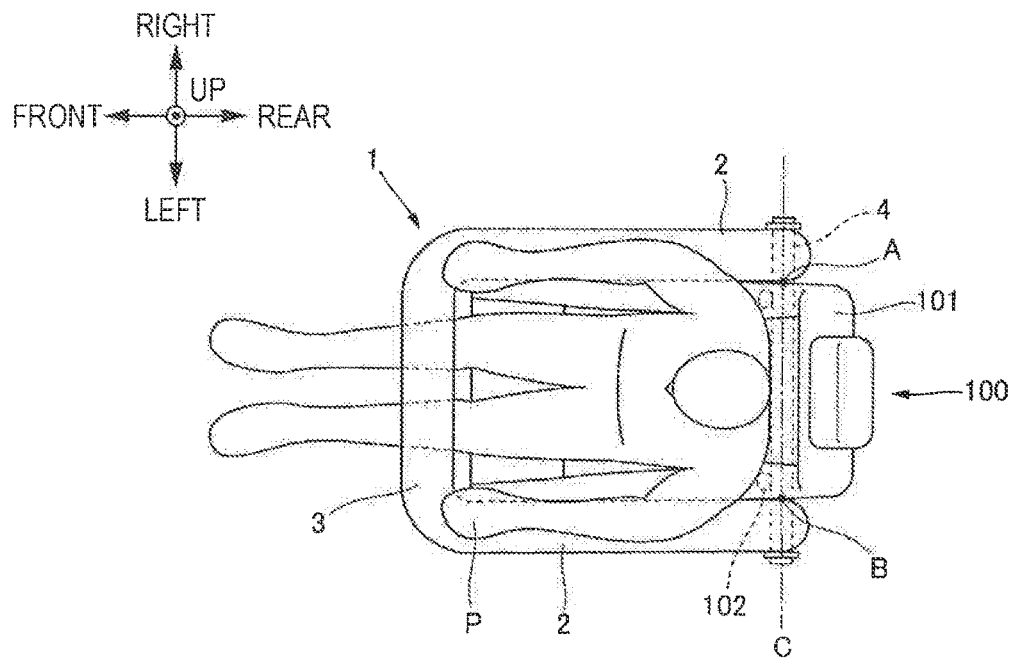

FIGS. 1A and 1B schematically illustrate a seat 100 equipped with an arm rest 1 according to an example of the present invention. FIG. 1A is a side view schematically illustrating the seat 100, and FIG. 1B is a plan view schematically illustrating the seat 100.

As illustrated in FIGS. 1A and 1B, the arm rest 1 is attached to the seat 100 and has side members 2, a front member 3, and a rear member 4.

For instance, as illustrated in FIG. 1B, the side members 2 are provided. as a pair at the left and right sides of a vehicle occupant P and are tubular members extending substantially parallel to the front-rear direction. The extending direction of the side members 2 may be slanted to a certain extent in either one of the up-down direction and the left-right direction relative to the front-rear direction so long as the extending direction is substantially parallel to the front-rear direction.

The front member 3 is a tubular member provided in front of the vehicle occupant P. In particular, as illustrated in FIG. 1A, the front member 3 couples the front ends of the left and right side members 2 to each other at least when in use, as indicated by a solid line. In this example, the side members 2 and the front member 3 are integrated such that the front sides of the side members 2 are coupled to each other not only when in use but also when not in use, such as when the vehicle is parked and when the vehicle occupant P moves away from the seat 100 to exit the vehicle.

In an alternative example of the present invention, the front member 3 may be of an unintegrated type in which the front member 3 does not couple the side members 2 to each other when not in use, so long as the front member 3 couples the side members 2 to each other when in use.

The rear member 4 is coupled to the seat 100 and to the rear ends of the side members 2. In particular, as illustrated in FIG. 1B, the rear member 4 according to this example is a shaft member extending through a seat back 101 in the left-right direction. The left and right ends of the rear member 4 that are exposed from the seat back 101 are respectively coupled to the side members 2. The rear member 4 is securely attached to a seat frame 102 disposed within the seat back 101 so as to be immovable in the front-rear direction, the left-right direction, and the up-down direction of the vehicle.

The side members 2 and the front member 3 are rotatable about a line (i.e., an imaginary line C in FIG. 1B) that connects left and right coupled points A and B between the rear member 4 and the seat back 101. The imaginary line C is substantially parallel to and substantially aligned with the central axis of the rear member 4. In this example, the rear member 4 functions as a hinge. Thus, the side members 2 and the front member 3 when not in use are rotated upward so as not to interfere with the boarding and exiting process of the vehicle occupant P. When in use, the side members 2 and the front member 3 are rotated downward so that the side members 2 are set substantially parallel to the horizontal direction after the vehicle occupant P is seated, thereby allowing the vehicle occupant P to place his/her arms on the arm rest 1.

As illustrated in FIGS. 1A and 1B, the side members 2, the front member 3, and the rear member 4 form a substantially rectangular ring shape in plan view. Accordingly, when the arm rest 1 is being used, the vehicle occupant P is surrounded by the side members 2, the front member 3, and the seat 100 containing the rear member 4. Therefore, even if the vehicle cabin deforms in the event of a forward collision, an oblique collision, a lateral collision, and so on and an incoming object occurs in the vehicle cabin, the vehicle occupant P can be directly protected from the incoming object since the arm rest 1 is disposed between the incoming object and the vehicle occupant P. In particular, in the event of an oblique collision and a lateral collision, door components and vehicle-body components tend to enter the vehicle cabin as incoming objects. Even if a door component deforms into the vehicle cabin, the arm rest 1 equipped with the side members 2 and the front member 3 can suppress or prevent direct contact of the door component with the vehicle occupant P.

In a case where the arm rest 1 is applied to a vehicle equipped with either one of an automated driving system and a driving support system, the side members 2 and the front member 3 preferably have a shape such that the arms of the vehicle occupant P, a book, an electronic terminal, and so on can be placed or are readily placeable on the side members 2 and the front member 3. Moreover, in order to protect the vehicle occupant P from an incoming object, it is preferable that at least a portion of the side members 2 and the front member 3 be composed of a rigid material.

Because the rear member 4 is fixed to the seat frame 102 in this example, the arm rest 1 is less likely to be positionally displaced by, for instance, an impact caused by a collision. Moreover, even if an incoming object in the vehicle cabin hits against the arm rest 1, the arm rest 1 can exhibit a reactive force.

As an alternative to the example illustrated in FIGS. 1A and 1B in which the rear member 4 is a single shaft member, the rear member 4 may be split members and does not have to extend through the seat back 101 so long as the rear member 4 according to the example of the present invention is rotatable about the line connecting the left and right coupled points of the rear member 4 and the seat 100.

Shape-Changing and Movement Modes of Arm Rest

Figure 2A:
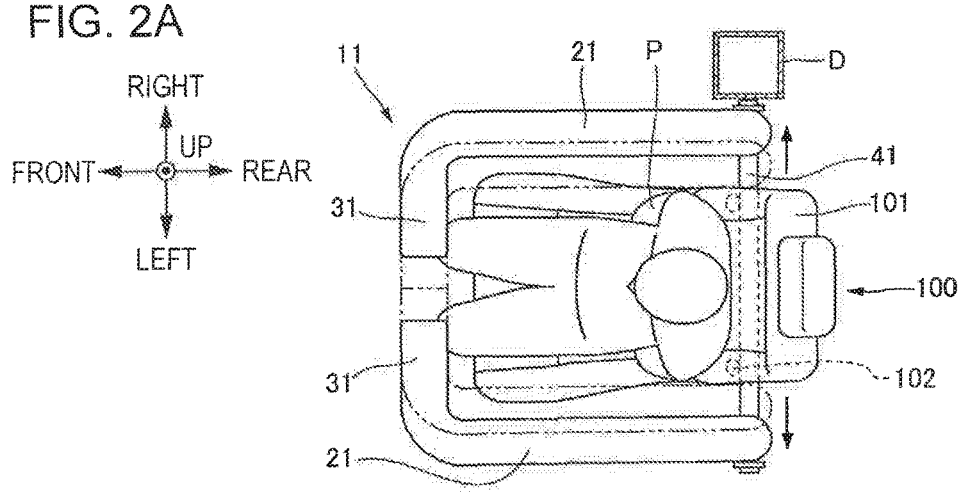
FIGS. 2A to 2C are plan views schematically illustrating seats having arm rests according to other examples.
Figure 2B:
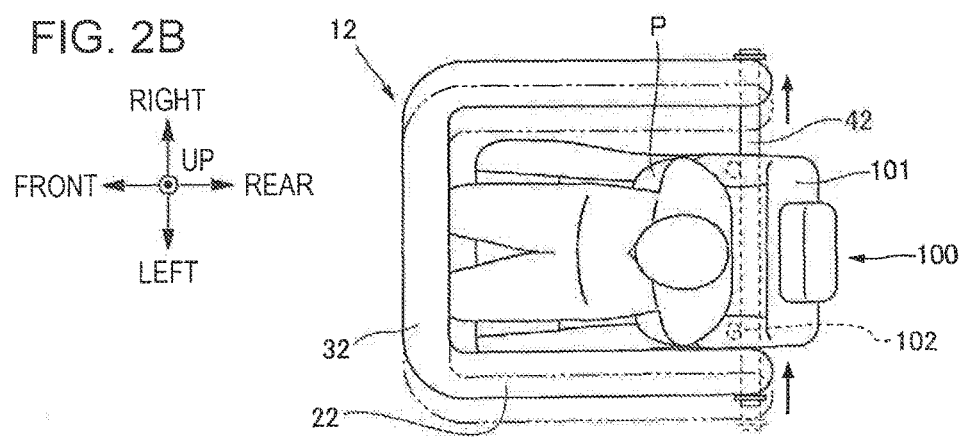
Figure 2C:
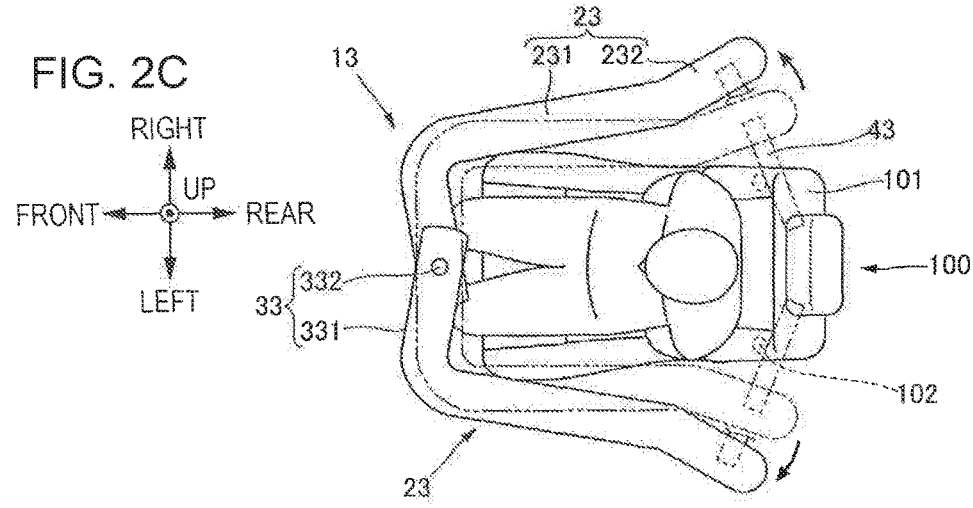

Modifications of the arm rest according to the example of the present invention will now be described. Examples illustrated in FIGS. 2A to 2C are for reducing or suppressing an increase in an injury value of the vehicle occupant P caused by the arm rest particularly when the upper body of the vehicle occupant P moves in the event of a collision. Specifically, FIGS. 2A, 2B, and 2C share in common that the arm rest moves away from the vehicle occupant P in the event of a collision so as to prevent the vehicle occupant P from hitting against the arm rest.

FIGS. 2A to 2C are plan views schematically illustrating seats 100 having arm rests 11 to 13, respectively, according to other examples, in each of FIGS. 2A to 2C, the arm rest when being used is indicated by a dashed line, whereas the arm rest when being changed in shape or moved in the event of a collision is indicated by a solid line.

An arm rest 11 illustrated in FIG. 2A has side members 21, split front members 31, and a rear member 41.

Since the side members 21 are similar to the side members 2 described above, a detailed description thereof will be omitted.

The split front members 31 are coupled to the. left and right side members 21 and are tubular members split at substantially the center in the left-right direction. The split front members 31 are coupled to each other when in use, as indicated by a dashed line.

In contrast to the above-described rear member 4 that is immovable in the front-rear direction, the left-right direction, and the up-down direction, the rear member 41 is provided as a shaft member that is coupled to the rear ends of the side members 21 and that is expandable and contractible in the left-right direction by either one of an appropriate actuator and pneumatic driving mechanism.

In a case where the vehicle occupant P comes into contact with the side members 21 to an extent that the injury value of the vehicle occupant P may increase when an oblique collision or a lateral collision occurs or when a collision is predicted, the arm rest 11 is moved, as indicated by the solid line in FIG. 2A. Specifically, the rear member 41 expands substantially in the left-right direction to release the coupled state of the split front members 31, thereby causing the side members 21 and the split front members 31 to move away from each other toward the left and right sides. Consequently, the areas particularly between the vehicle occupant P and the side members 21 expand, so that the upper body of the vehicle occupant P becomes less likely to come into contact with the side members 21 even if the upper body moves in the left-right direction due to a collision.

Because the arm rest 11 is located between, for instance, the door components that tend to deform toward the vehicle cabin and the vehicle occupant P even after the side members 21 have moved, the function for protecting the vehicle occupant P from an incoming object is less likely to deteriorate.

The rear member 41 is expanded until the rear member 41 moves into abutment with a center pillar D serving as one of vehicle-body components, as illustrated in FIG. 2A. Consequently, the survival space of the vehicle occupant P can be expanded to a point that may become an origin of deformation toward the vehicle cabin at the lateral sides of the vehicle occupant P.

In this example of the present invention, at least one of the side members or the rear member may be moved into abutment with a door component, such as a door trim, instead of a vehicle-body component, such as a pillar serving as a frame member.

Furthermore, the side members 21 and the rear member 41 are preferably fixed at positions to which they are moved by appropriate distances, so that the survival space of the vehicle occupant P expanded by moving the rear member 41 can be prevented from being reduced.

An arm rest 12 illustrated in FIG, 2B has side members 22, a front member 32, and a rear member 42.

Since the side members 22 and the front member 32 are similar to the side members 2 and the front member 3 described above, detailed descriptions thereof will be omitted.

In contrast to the above-described rear member 4 that is immovable in the front-rear direction, the left-right direction, and the up-down direction, the rear member 42 is provided as a shaft member that is coupled to the rear ends of the side members 22 and that is movable, that is, slidable, parallel to the left-right direction by either one of an appropriate actuator and pneumatic driving mechanism.

In a case where the vehicle occupant P comes into contact with the side members 22 to an extent that the injury value of the vehicle occupant P may increase when an oblique collision or a lateral collision occurs or when a collision is predicted, the arm rest 12 is moved, as indicated by the solid line in FIG. 2B. Specifically, the example illustrated in FIG. 2B is preferably applied in a case where the direction of collision, that is, the direction in which the upper body of the vehicle occupant P moves, is detectable. The moving direction of the upper body of the vehicle occupant P is detected by using a detection member, such as a vehicle exterior sensor used when predicting the direction of collision and an acceleration sensor that detects the direction of collision in the event of a collision.

Specifically, the rear member 42 slides toward one side substantially in the left-right direction and in the same direction as the direction in which the vehicle occupant P moves due to a collision (for instance, rightward in FIG. 2B), thereby causing the side members 22 and the front member 32 to move in accordance with the vehicle occupant P. Consequently, the areas particularly between the vehicle occupant P and the side members 22 expand, so that the upper body of the vehicle occupant P becomes less likely to come into contact with the side members 22 even if the upper body moves in the left-right direction due to a collision.

Because the arm rest 12 is located between, for instance, the door components that tend to deform toward the vehicle cabin and the vehicle occupant P even after the side members 22 have moved, the function for protecting the vehicle occupant P from an incoming object is less likely to deteriorate.

Although not illustrated, the rear member 42 can be moved until the rear member 42 is brought into abutment with either one of a vehicle-body component, such as a center pillar D, and a door component, such as a door trim, as illustrated in FIG. 2A. Consequently, the survival space of the vehicle occupant P can be expanded to a point that may become an origin of deformation toward the vehicle cabin at the lateral sides of the vehicle occupant P.

Furthermore, the rear member 42 is preferably fixed at a position to which it is moved by an appropriate distance, so that the expanded survival space of the vehicle occupant P can be prevented from being reduced.

An arm rest 13 illustrated in FIG. 2C has side members 23, a front member 33, and a rear member 43.

Each of the side members 23 is a tubular member having a front-rear extending segment 231 and a slanted segment 232. Similar to the side members 2 described above, the front-rear extending segments 231 extend substantially parallel to the front-rear direction. The vehicle occupant P can place his/her arms on the side members 23. The slanted segments 232 extend rearward in the front-rear direction and are slanted outward in the width direction of the seat 100.

The front member 33 is a tubular member having split front segments 331 and a shape-changing shaft 332. The split front segments 331 are split into left and right segments that partially overlap at substantially the center in the left-right direction. The split front segments 331 are respectively coupled to the left and right front-rear extending segments 231. The shape-changing shaft 332 is a shaft member that couples the overlapping regions of the split front segments 331 to each other. The split front segments 331 are rotatable about the shape-changing shaft 332.

In contrast to the above-described rear member 4 that is immovable in the front-rear direction, the left-right direction, and the up-down direction, the rear member 43 is provided as a shaft member that is slanted forward and outward in the width direction of the seat 100. The rear member 43 is split into left and right segments, and the left and right segments are respectively coupled to the slanted segments 232 of the side members 23. The rear member 43 is expandable and contractible substantially parallel to the axial direction of the rear member 43 by either one of an appropriate actuator and pneumatic driving mechanism. Because the slanted segments 232 of the side members 23 and the rear member 43 that are coupled to each other are slanted substantially in opposite directions from each other, the effect of the slanted layout is canceled out, so that the side members 23 and the front member 33 are rotatable in the up-down direction, similarly to the example illustrated in FIGS. 1A and 1B.

In a case where the vehicle occupant P comes into contact with the side members 22 to an extent that the injury value of the vehicle occupant P may increase when an oblique collision or a lateral collision occurs or when a collision is predicted, the arm rest 13 is changed in shape, as indicated by the solid line in FIG. 2C. Specifically, the rear member 43 expands so as to cause the side members 23 and the split front segments 331 to open outward in the width direction of the seat 100 about the shape-changing shaft 332, thus resulting in a change in shape. Consequently, the areas particularly between the vehicle occupant P and the side members 23 expand, so that the upper body of the vehicle occupant P becomes less likely to come into contact with the side members 23 even if the upper body moves in the left-right direction due to a collision.

Because the arm rest 13 is located between, for instance, the door components that tend to deform toward the vehicle cabin and the vehicle occupant P even after the side members 23 have moved, the function for protecting the vehicle occupant P from an incoming object is less likely to deteriorate.

Although not illustrated, the rear member 43 can be expanded until at least one of the side members 23 or the rear member 43 is brought into abutment with either one of a vehicle-body component, such as a center pillar D, and a door component, such as a door trim, as illustrated in FIG. 2A. Consequently, the survival space of the vehicle occupant P can be expanded to a point that may become an origin of deformation toward the vehicle cabin at the lateral sides of the vehicle occupant P.

Furthermore, the rear member 43 is preferably fixed at a position to which it is moved by an appropriate distance, so that the expanded survival space of the vehicle occupant P can be prevented from being reduced.

Another Vehicle-Occupant Protection Mode Using Arm Rest

Next, a more reliable vehicle-occupant protection mode using an arm rest according to an example of the present invention will be described with reference to FIGS. 3A and 3B.

Figure 3A:
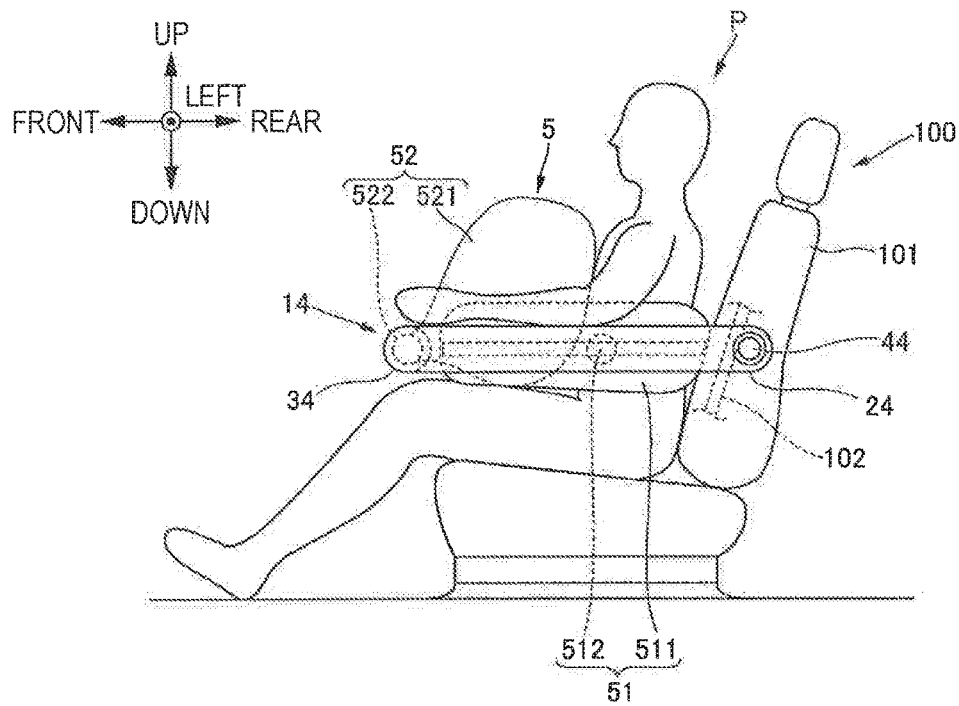
FIGS. 3A and 3B schematically illustrate a seat equipped with an arm rest according to another example of the present invention, FIG. 3A being a side view schematically illustrating the seat, FIG. 3B being a plan view schematically illustrating the seat.
Figure 3B:
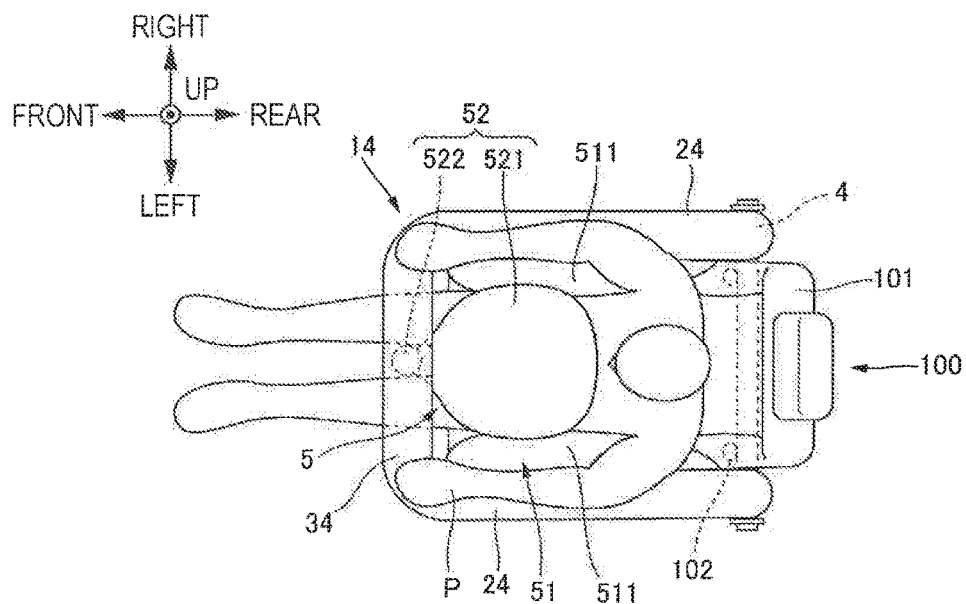

FIGS. 3A and 3B schematically illustrate a seat 100 equipped with an arm rest 14 according to another example of the present invention. FIG. 3A is a side view schematically illustrating the seat 100, and FIG. 3B is a plan view schematically illustrating the seat 100.

The arm rest 14 illustrated in FIGS. 3A and 3B includes an airbag 5. As illustrated in FIGS. 3A and 3B, the arm rest 14 has side members 24, a front member 34, and a rear member 44 that have the same shapes and that are disposed at the same positions as the side members 2, the front member 3, and the rear member 4 of the arm rest 1 illustrated in FIGS. 1A and 1B.

The airbag 5 has lateral airbags 51 and a front airbag 52.

The lateral airbags 51 deploy toward the vehicle occupant P from the left and right side members 24 and each has a lateral airbag body 511 and a lateral inflator 512.

The lateral airbag bodies 511 are bags extending substantially in the front-rear direction along the side members 24 and deploy substantially in the left-right direction from the inner sides of the side members 24, that is, from the opposing regions of the pair of side members 24, of the arm rest 14 having a substantially ring shape.

The lateral inflators 512 are gas generators provided inside the respective side members 24 and are driven so as to pressure-feed gas into the respective lateral airbag bodies 511.

The front airbag 52 deploys toward the vehicle occupant P from the front member 34 and has a front airbag body 521 and a front inflator 522.

The front airbag body 521 is a bag extending from the front member 34 to the front side of the upper body of the vehicle occupant P and deploys from the inner side of the substantially-ring-shaped arm rest 14, that is, from the region of the front member 34 that faces the vehicle occupant P.

The front inflator 522 is a gas generator provided inside the front. member 34 and is driven so as to pressure-feed gas into the front airbag body 521.

The method of using the airbag 5 involves driving the lateral inflators 512 and the front inflator 522 when a collision occurs or when a collision is predicted so as to pressure-feed gas into the lateral airbag bodies 511 and the front airbag body 521, Consequently, for instance, the surfaces of the side members 24 and the front member 34 become ruptured, thus causing the lateral airbag bodies 511 and the front airbag body 521 to deploy toward the vehicle occupant P from the side members 24 and the front member 34.

By causing the airbag bodies to deploy toward the vehicle occupant P, the airbag bodies can fill the areas between the side and front members 24 and 34 and the vehicle occupant P. Accordingly, in addition to the function of the substantially-ring-shaped arm. rest 14 for directly protecting the vehicle occupant P from an incoming object, the vehicle occupant P can be restrained by the airbag 5 so that the vehicle occupant P can be more reliably protected. Since the airbag 5 can be deployed from a position closer to the vehicle occupant P than existing airbags, such as a front airbag from the steering wheel and a curtain airbag from near the roof, the vehicle occupant P can be protected quickly with a low volume of gas.

In the example illustrated in FIGS. 3A and 3B, the airbag 5 is deployed in a state where the arm rest 14 is fixed. Alternatively, in an example of the present invention, the airbag and any one of the shape-changing and movement modes of the armrests illustrated in FIGS. 2A to 2C may be combined. With this combination, the survival space of the vehicle occupant P can be ensured by the movement or change in shape of the armrest, while the deployed airbag can restrain the vehicle occupant P from an earlier stage, as compared with the front airbag, even if the vehicle occupant P moves or is about to move due to an impact.

Although the examples of the present invention made by the present inventor have been described above, the examples of the present invention are not limited by the description and drawings that constitute a part of the disclosure of the present invention. In other words, it should be noted that other examples, applications, technologies, and so on achievable by a skilled person based on the above examples are all included in the scope of the present invention.

According to the examples of the present invention, the vehicle occupant is surrounded by the front member, the side members, and the seat, so that even when the vehicle cabin deforms, the front member and the side members disposed between. the vehicle occupant and the deformed area can directly protect the vehicle occupant, whereby an arm rest that can protect the vehicle occupant from an incoming object occurring in the vehicle cabin can be provided.

The invention claimed is:

1. An arm rest attachable to a seat for a vehicle occupant to sit on, the arm rest comprising:
   side members;
   a front member; and
   a rear member,
   wherein the side members comprise a pair of side members provided at left and right sides of the vehicle occupant and extending in a front-rear direction,
   wherein the front member is in front of the vehicle occupant when the vehicle occupant is seated and is configured to couple front sides of the left and right side members to each other at least when in use,
   wherein the rear member couples the seat to rear sides of the side members, and
   wherein the side members and the front member are rotatable about a line that connects left and right coupled points between the rear member and the seat, and
   wherein the side members are configured to move away from the vehicle occupant when a collision occurs or when a collision is predicted.

2. The arm rest according to claim 1,
   wherein the side members are configured to move to increase in width at least toward one side in a left-right direction.

3. The arm rest according to claim 2,
   wherein the side members are configured to move until coming into abutment with either one of a door component and a vehicle-body component.

4. The arm rest according to claim 3,
   wherein at least one of the front member or the side members comprises an airbag configured to deploy toward the vehicle occupant.

5. The arm rest according to claim 2,
   wherein at least one of the front member or the side members comprises an airbag configured to deploy toward the vehicle occupant.

6. The arm rest according to claim 1,
   wherein the side members are configured to slide in the same direction as a direction in which the vehicle occupant moves due to the collision.

7. The arm rest according to claim 6,
   wherein the side members are configured to move until coming into abutment with either one of a door component and a vehicle-body component.

8. The arm rest according to claim 7,
   wherein at least one of the front member or the side members comprises an airbag configured to deploy toward the vehicle occupant.

9. The arm rest according to claim 6,
   wherein at least one of the front member or the side members comprises an airbag configured to deploy toward the vehicle occupant.

10. The arm rest according to claim 1,
    wherein the side members are configured to move until coming into abutment with either one of a door component and a vehicle-body component.

11. The arm rest according to claim 10,
wherein at least one of the front member or the side members comprises an airbag configured to deploy toward the vehicle occupant.

12. The arm rest according to claim 1,
wherein at least one of the front member or the side members comprises an airbag configured to deploy toward the vehicle occupant.

13. The arm rest according to claim 1,
wherein the front member comprises split front segments each having an interior end and wherein the interior ends are adjustable in relative position.

14. The arm rest according to claim 13,
wherein the front member comprises a rotation shaft rotatably coupled to the interior ends of the split front segments such that the interior ends are rotatable with respect to each other about the rotation shaft.

15. The arm rest according to claim 13,
wherein the interior ends are arranged as to move away from each other when a collision occurs or when a collision is predicted.

\* \* \* \* \*